(12) United States Patent
Sugino et al.

(10) Patent No.: US 8,670,048 B2
(45) Date of Patent: Mar. 11, 2014

(54) APPARATUS AND METHODS FOR REDUCING BLUR IN CAMERA IMAGES

(75) Inventors: Akinobu Sugino, Kanagawa (JP); Nozomu Ozaki, Kanagawa (JP); Masamichi Asukai, Kanagawa (JP); Taiji Ito, Kanagawa (JP); Hidehiko Sekizawa, Tokyo (JP); Akane Sano, Tokyo (JP); Hirotaka Sakaguchi, Tokyo (JP); Yoshiteru Kamatani, Kanagawa (JP); Yoichiro Sako, Tokyo (JP); Itaru Kawakami, Kanagawa (JP)

(73) Assignee: Sony Corporation, Tokyo (JP)

( * ) Notice: Subject to any disclaimer, the term of this patent is extended or adjusted under 35 U.S.C. 154(b) by 650 days.

(21) Appl. No.: 12/215,282

(22) Filed: Jun. 26, 2008

(65) Prior Publication Data

US 2009/0073286 A1 Mar. 19, 2009

(30) Foreign Application Priority Data

Jul. 2, 2007 (JP) .................................. 2007-174312

(51) Int. Cl.
*H04N 5/76* (2006.01)

(52) U.S. Cl.
USPC .................... 348/231.99; 348/154; 348/208.2; 348/208.4; 348/352; 348/367

(58) Field of Classification Search
USPC ............... 348/367, 231.99, 154, 208.2, 208.4
See application file for complete search history.

(56) References Cited

U.S. PATENT DOCUMENTS

| | | | |
|---|---|---|---|
| 4,959,725 A | | 9/1990 | Mandle |
| 5,043,816 A | * | 8/1991 | Nakano et al. ........... 348/333.01 |
| 7,110,024 B1 | | 9/2006 | Silverbrook et al. |
| 2001/0007469 A1 | * | 7/2001 | Fuchimukai et al. ......... 348/208 |
| 2004/0081441 A1 | * | 4/2004 | Sato et al. ....................... 396/52 |
| 2005/0285948 A1 | | 12/2005 | Weinberg |
| 2006/0185431 A1 | | 8/2006 | Birecki et al. |
| 2007/0296821 A1 | * | 12/2007 | Kakkori ..................... 348/208.6 |

FOREIGN PATENT DOCUMENTS

| | | |
|---|---|---|
| GB | 2162019 A | 1/1986 |
| JP | 5-316404 A | 11/1993 |
| JP | 07-218970 | 8/1995 |
| JP | 09-116858 A | 5/1997 |
| JP | 11-136557 A | 5/1999 |
| JP | 2000-253304 A | 9/2000 |
| JP | 2006-020096 A | 1/2006 |
| JP | 2006-245847 A | 9/2006 |

* cited by examiner

*Primary Examiner* — Usman Khan

(74) *Attorney, Agent, or Firm* — Wolf, Greenfield & Sacks, P.C.

(57) ABSTRACT

An image-pickup apparatus includes an image-pickup section that picks up images to obtain picked-up-image-data items, a temporarily retaining section that temporarily retains the picked-up-image-data items, a storage-process section that performs a storage process on the picked-up-image-data items, a movement-detecting section that detects a movement of the image-pickup apparatus, an operation section that performs a shutter operation, and a control section that causes the temporarily retaining section to retain picked-up-image-data items in a shutter-operation period, that selects, on the basis of detection results obtained by the movement-detecting section in the shutter-operation period, a picked-up-image-data item from among the retained picked-up-image-data items, and that causes the storage-process section to perform the storage process on the selected picked-up-image-data item.

16 Claims, 7 Drawing Sheets

APPARATUS AND METHODS FOR REDUCING BLUR IN CAMERA IMAGES

CROSS REFERENCES TO RELATED APPLICATIONS

The present invention contains subject matter related to Japanese Patent Application JP 2007-174312 filed in the Japanese Patent Office on Jul. 2, 2007, the entire contents of which are incorporated herein by reference.

BACKGROUND OF THE INVENTION

1. Field of the Invention

The present invention relates to an image-pickup apparatus and an image-pickup method, and more specifically, it relates to a technology capable of obtaining a picked-up image that is not influenced by camera shake caused by a hand movement.

2. Description of the Related Art

In the related art, when an image-pickup operator picks up an image using an image-pickup apparatus, such as a digital still camera, there are cases in which so-called camera shake caused by a hand movement occurs, and in which a picked-up image suffering from image shake is picked up. In most cases, when the image-pickup operator performs a shutter operation, a body of the image-pickup apparatus is moved by pushing a shutter button in order to trigger the shutter operation, resulting in an occurrence of the camera shake caused by a hand movement.

As a technology capable of avoiding the camera shake caused by a hand movement, Japanese Unexamined Patent Application Publication No. 2000-253304 discloses a technology in which image processing is performed. In the image processing, a comparison is performed among still images, which were continuously picked up, of an object in a group for a dynamic portion of the object to extract a still image that does not suffer from image shake for the dynamic portion of the object. By using the technology, a still image that does not suffer from image shake can be extracted from among a large number of still images.

SUMMARY OF THE INVENTION

However, because, in the technology disclosed in Japanese Unexamined Patent Application Publication No. 2000-253304, the image processing in which a comparison is performed among a plurality of still images, when all of the still images to be compared suffer from image shake, it is difficult to extract a still image that does not suffer from image shake.

Additionally, since the image processing in which a comparison is performed among a plurality of still images is performed, that leads to occurrences of, for example, the following things: an increase in the processing load; an increase in the processing time; a complication of a circuit configuration; and an increase in size of the circuit configuration. Furthermore, a high-performance processing device is necessary for the image processing. For this reason, the cost of the apparatus is increased.

Accordingly, it is desirable to prevent the quality of a picked-up image from being reduced due to camera shake caused by a hand movement that occurs in a case in which an image-pickup operator picks up an image using an image-pickup apparatus.

An image-pickup apparatus according to an embodiment of the present invention includes the following elements: image-pickup means for picking up images of an object to obtain picked-up-image-data items; temporarily retaining means for temporarily retaining the picked-up-image-data items obtained by the image-pickup means; storage-process means for performing a storage process on the picked-up-image-data items; movement-detecting means for detecting a movement of the image-pickup apparatus; operation means for performing a shutter operation; and control means for causing the temporarily retaining means to retain picked-up-image-data items in a plurality of frames obtained by the image-pickup means in a shutter-operation period in which the shutter operation is being performed by the operation means, selecting, on the basis of detection results obtained by the movement-detecting means in the shutter-operation period, a picked-up-image-data item to be subjected to the storage process from among the picked-up-image-data items retained by the temporarily retaining means, and performing control of causing the storage-process means to perform the storage process on the selected picked-up-image-data item.

The control means may select, as the picked-up-image-data item to be subjected to the storage process, a picked-up-image-data item that was picked up by the image-pickup means at a time at which a detection result showing stopping of the movement was obtained by the movement-detecting means, and that is retained by the temporarily retaining means.

Additionally, the control means may select, as the picked-up-image-data item to be subjected to the storage process, a picked-up-image-data item that was picked up by the image-pickup means at a time at which the closest detection result to a detection result showing stopping of the movement was obtained by the movement-detecting means, and that is retained by the temporarily retaining means.

Furthermore, in the shutter-operation period in which the shutter operation is being performed by the operation means, the control means may cause the temporarily retaining means to retain picked-up-image-data items in a plurality of frames obtained by the image-pickup means in a period that is determined on the basis of the detection results obtained by the movement-detecting means.

The image-pickup apparatus may further include warning means for outputting a warning. When the control means was not able to select the picked-up-image-data item to be subjected to the storage process on the basis of the detection results obtained by the movement-detecting means, the control means may cause the warning means to output the warning.

An image-pickup-control method according to an embodiment of the present invention is a method for an image-pickup apparatus that picks up images of an object in response to a shutter operation. The image-pickup-control method includes the followings: a temporal-retention-controlling step of temporarily retaining picked-up-image-data items in a plurality of frames that were obtained by picking up images in a shutter-operation period; a movement-detecting step of detecting a movement of the image-pickup apparatus in the shutter-operation period; and a storage-instructing step of selecting, on the basis of detection results obtained in the movement-detecting step, a picked-up-image-data item to be subjected to a storage process from among the temporarily retained picked-up-image-data items, and issuing an instruction for the storage process of storing the selected picked-up-image-data item.

According to the embodiments of the present invention, basically, images of the object are picked up in response to the shutter operation to obtain picked-up-image-data items, and a process of storing the picked-up-image-data items is performed. In the embodiments of the present invention, in the period in which the shutter operation is being performed, a memory serving as the temporarily retaining means is caused to temporarily retain the picked-up-image-data items in the plurality of frames. The detection results that were obtained by the movement-detecting means, such as an acceleration sensor, in the shutter operation are retained. From among the picked-up-image-data items in the plurality of frames that are temporarily retained, on the basis of the detection results concerning the movement of the image-pickup apparatus, the picked-up-image-data item to be stored is selected and stored. In other words, the picked-up-image-data item is stored as a "photograph" obtained in response to the shutter operation.

For example, a process is performed, in which a frame that was picked up in a case in which the movement of the image-pickup apparatus was the smallest in the period in which the shutter operation was being performed is stored as a picked-up-image-data item obtained by "photography" performed in response to the shutter operation.

According to the embodiments of the present invention, the picked-up-image-data items in the plurality of frames are temporarily stored in the period in which the shutter operation is being performed, and, from among the picked-up-image-data items, the picked-up-image-data item that is to be subjected to the storage process is selected on the basis of the detection results concerning the movement of the image-pickup apparatus. Accordingly, a picked-up-image-data item that was picked up in a case in which the movement of the image-pickup apparatus was the smallest can be stored as a "picked-up photograph" obtained in response to the shutter operation. In other words, even when the image-pickup apparatus is moved due to an occurrence of camera shake caused by a hand movement in a case in which an image-pickup operator performs the shutter operation, a picked-up-image-data item that is not influenced by camera shake caused by a hand movement can be stored.

It is not necessary to add a large-scale mechanism or a process that is used to realize a function of avoiding camera shake caused by a hand movement. Thus, the configuration of the apparatus or the processes can be simplified, and the cost reduction resulting from the simplification can be enhanced.

DESCRIPTION OF THE PREFERRED EMBODIMENTS

Embodiments of the present invention will be described below. The description will be made in the order of section headings as follows:
1. Configuration Example of Image-Pickup Apparatus;
2. First Example of Image-Pickup-Process Operation;
3. Second Example of Image-Pickup-Process Operation;
4. Third Example of Image-Pickup-Process Operation; and
5. Modifications 1. Configuration Example of Image-Pickup Apparatus As an example of an image-pickup apparatus according to an embodiment, an image-pickup apparatus that is, for example, a digital still camera will be described.

Figure 1:
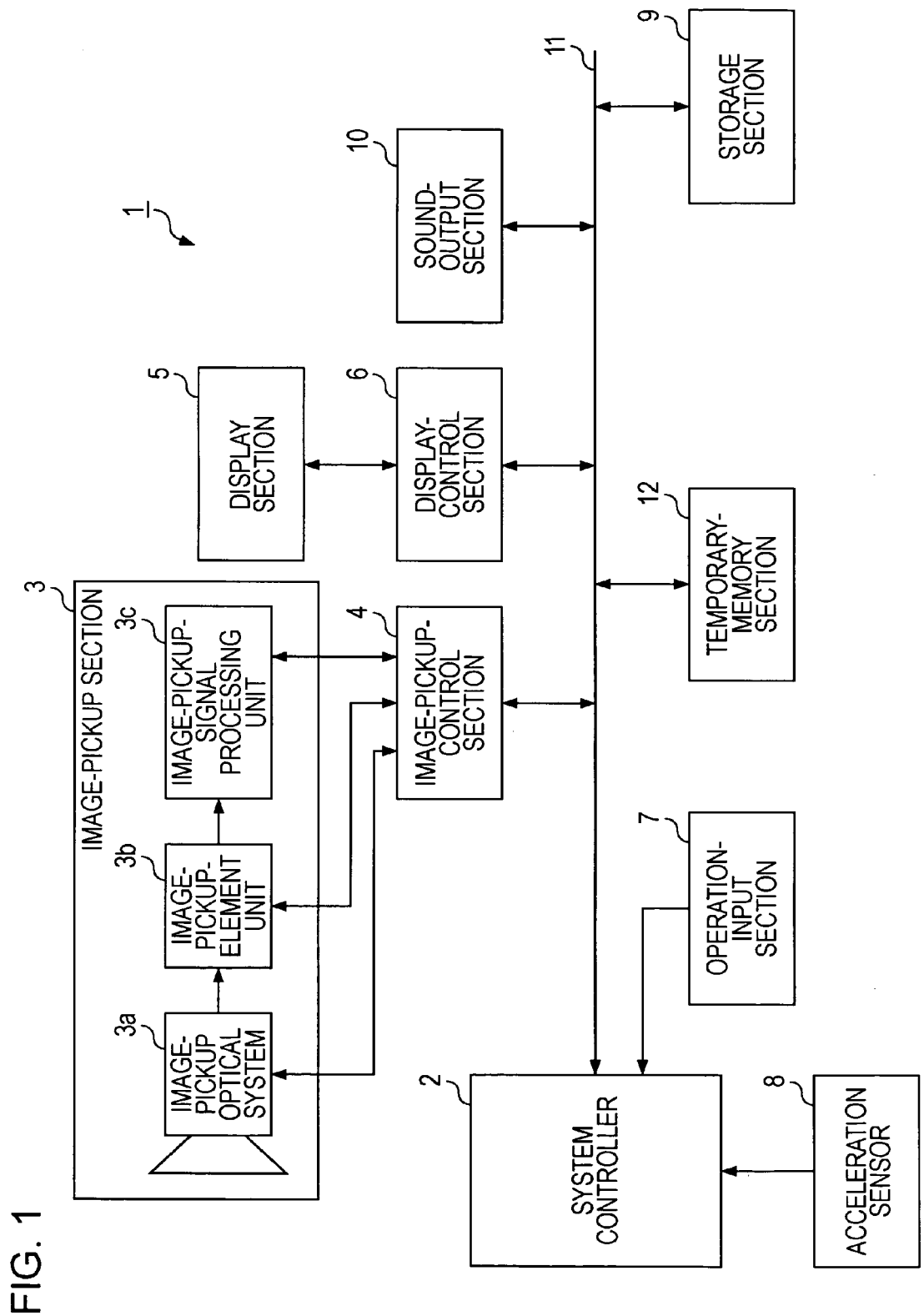
FIG. 1 is a block diagram of an image-pickup apparatus according to an embodiment of the present invention.

FIG. 1 is a block diagram showing an internal configuration of an image-pickup apparatus 1.

As described in FIG. 1, the image-pickup apparatus 1 includes a system controller 2, an image-pickup section 3, an image-pickup-control section 4, a display section 5, a display-control section 6, an operation-input section 7, an acceleration sensor 8, a storage section 9, a sound-output section 10, a bus 11, and a temporary-memory section 12.

The system controller 2 is configured using, for example, a microcomputer including a central processing unit (CPU), a read-only memory (ROM), a random-access memory (RAM), a non-volatile memory unit, and an interface unit. The system controller 2 is a control section that exercises overall control of the image-pickup apparatus 1. The system controller 2 performs various types of arithmetic processes, and sending/receiving of a control signal or the like to/from each of the units via the bus 11 on the basis of a program stored in the internal ROM or the like to cause the unit to perform a desired operation.

The image-pickup section 3 includes an image-pickup optical system 3a, an image-pickup element 3b, and an image-pickup-signal processing unit 3c.

The image-pickup optical system 3a of the image-pickup section 3 is provided with a lens system that includes a diaphragm, a zoom lens, and a focus lens, and so forth, a driving system that causes the lens system to perform a focus operation and a zoom operation, and so forth.

The image-pickup element 3b of the image-pickup section 3 is provided with a solid-state-image-pickup-element array that detects image-pickup light acquired by the image-pickup optical system 3a and that generates image-pickup signals by performing photoelectric conversion. The solid-state-image-pickup-element array may be, for example, a charge coupled device (CCD) sensor array or a complementary metal oxide semiconductor (CMOS) sensor array.

The image-pickup-signal processing unit 3c of the image-pickup section 3 is provided with a sample-and-hold/automatic gain control (AGC) circuit that performs gain adjustment and waveform shaping on signals obtained by solid-state-image-pickup elements, and a video analog-to-digital (A/D) converter to obtain a picked-up-image-data item as digital data. Additionally, the image-pickup-signal processing unit 3c performs a white balance process, a brightness process, a color-signal process, or the like on the picked-up-image-data item.

Picking up an image is performed by the image-pickup section 3 including the image-pickup optical system 3a, the image-pickup element 3b, and the image-pickup-signal processing unit 3c, thereby obtaining the picked-up-image-data item.

The image data item obtained by an image-pickup operation performed by the image-pickup section 3 is processed by the image-pickup-control section 4.

The image-pickup-control section 4 performs, on the basis of control exercised by the system controller 2, a process of converting the picked-up-image-data item into a predetermined image data format, and a process of supplying the converted picked-up-image-data item to the temporary-memory section 12, the storage section 9, or the display-control section 6 on the basis of an operation state.

The image-pickup-control section 4 also performs, on the basis of an instruction issued by the system controller 2, control of whether or not the image-pickup section 3 performs the image-pickup operation, control of driving the zoom lens and the focus lens of the image-pickup optical system 3a, control of sensitivity and a frame rate of the image-pickup element 3b, and control of a parameter used in each of the processes performed by the image-pickup-signal processing unit 3c, setting of a process to be executed, and so forth.

In the image-pickup apparatus 1, the display section 5 and the display-control section 6 are provided as sections configured to display data to a user.

The display section 5 is provided with a display-driving unit that drives a liquid-crystal display or the like to display data. The display-driving unit includes a pixel-driving circuit that causes, for example, the liquid-crystal display to display the image data item supplied from the image-pickup-control section 4. The pixel-driving circuit applies a driving signal based on an image signal to each of the pixels disposed in a matrix form in the liquid-crystal display at predetermined horizontal/vertical driving timings to perform a display.

The display-control section 6, on the basis of control exercised by the system controller 2, drives the pixel-driving circuit of the display section 5 to perform a predetermined display. In other words, the display-control section 6 causes the display section 5 to perform a display serving as an image-pickup monitor that monitors an image pickup performed by the image-pickup section 3.

In order to perform the display, the display-control section 6 can perform, for example, brightness-level adjustment, color correction, contrast adjustment, sharpness (edge enhancement) adjustment, and so forth. The display-control section 6 can also perform generation of an enlarged image in which a portion of image data is enlarged, generation of a reduced image, soft focus, mosaic, brightness conversion, highlighting (intensified display) of a portion of an image, an image-effect process of chaining the whole color atmosphere or the like, and so forth.

The operation-input section 7 includes an operation element such as a key, a button, or a dial. For example, the operation element is formed as an operation element that is used for, for example, an operation of turning on/off a power supply, an operation of turning on/off a function of avoiding camera shake caused by a hand movement, which is described below, or an operation of an image-pickup system, such as a shutter operation, a zoom operation, an operation of setting exposure, or a self-timer operation.

The operation-input section 7 supplies information obtained using the operation element to the system controller 2, and the system controller 2 performs necessary arithmetic processes and control for the information.

The acceleration sensor 8 detects the acceleration of the image-pickup apparatus 1 in a movement, and supplies a signal based on the detected acceleration to the system controller 2.

For example, when the user picks up an image of an object using the image-pickup apparatus 1, the acceleration sensor 8 can detect so-called vibration due to camera shake caused by a hand movement, which is vibration of the image-pickup apparatus 1 that is due to shake of a user's hand or the like.

The system controller 2 performs a process of obtaining a detected value of the acceleration of the image-pickup apparatus 1 in a movement as a signal supplied from the acceleration sensor 8.

The storage section 9 is used to store various types of data items. For example, the storage section 9 is used to store the picked-up-image-data item.

The storage section 9 may be configured using a solid memory such as a flash memory, and may also be configured using, for example, a hard disk drive (HDD).

The storage section 9 is not necessarily a built-in recording medium. For example, the storage section 9 may be a record-reproducing drive supporting a portable recoding medium, such as a memory card in which a solid memory is built in, an optical disk, a magneto-optical disk, or a hologram memory.

In the storage section 9, both a built-in memory, such as a solid memory or an HDD, and the record-reproducing drive supporting a portable recording medium may be mounted.

The storage section 9 records and stores the picked-up image data item on the basis of control exercised by the system controller 2.

Additionally, on the basis of control exercised by the system controller 2, the storage section 9 reads recorded data, and supplies the recorded data to the system controller 2 or the display-control section 6.

The sound-output section 10 includes, for example, a sound-generating unit, a speech-synthesis unit, an amplifier circuit, a speaker, and so forth. The sound-output section 10 performs a sound output of a warning sound, a message, or the like on the basis of an instruction issued by the system controller 2. For example, when the system controller 2 issues an instruction for generation of an electronic sound or an instruction for speech synthesis to the sound-output section 10, the sound-output section 10 can generate a sound signal as a warning sound or a message sound. The sound-output section 10 can amplify the generated sound signal using the amplifier circuit, and can output the amplified sound signal from the speaker as a sound.

The temporary-memory section 12 may be a volatile memory used to temporarily store the picked-up-image-data item.

The temporary-memory section 12 can temporarily retain the picked-up-image-data item, which is supplied from the image-pickup-control section 4, and can supply the picked-up-image-data item to the storage section 9 on the basis of an instruction issued by the system controller 2.

A configuration of the image-pickup apparatus 1 has been described above, but the configuration is only an example. In accordance with an operation example or a function that is performed, various types of configuration elements may be added to or removed from the configuration.

2. First Example of Image-Pickup-Process Operation

The image-pickup apparatus 1 in a first example, which has the configuration, performs a picked-up-image-selecting-process operation in which the function of avoiding camera shake caused by a hand movement is realized. In the function, a picked-up image suffering from image shake, for example, which is influenced by camera shake caused by a hand movement that occurs due to a user performance of a shutter operation, is not selected, and a picked-up image that does not suffer from image shake is selected.

The picked-up-image-selecting-process operation according to the embodiment of the present invention will be described below.

Figure 2:
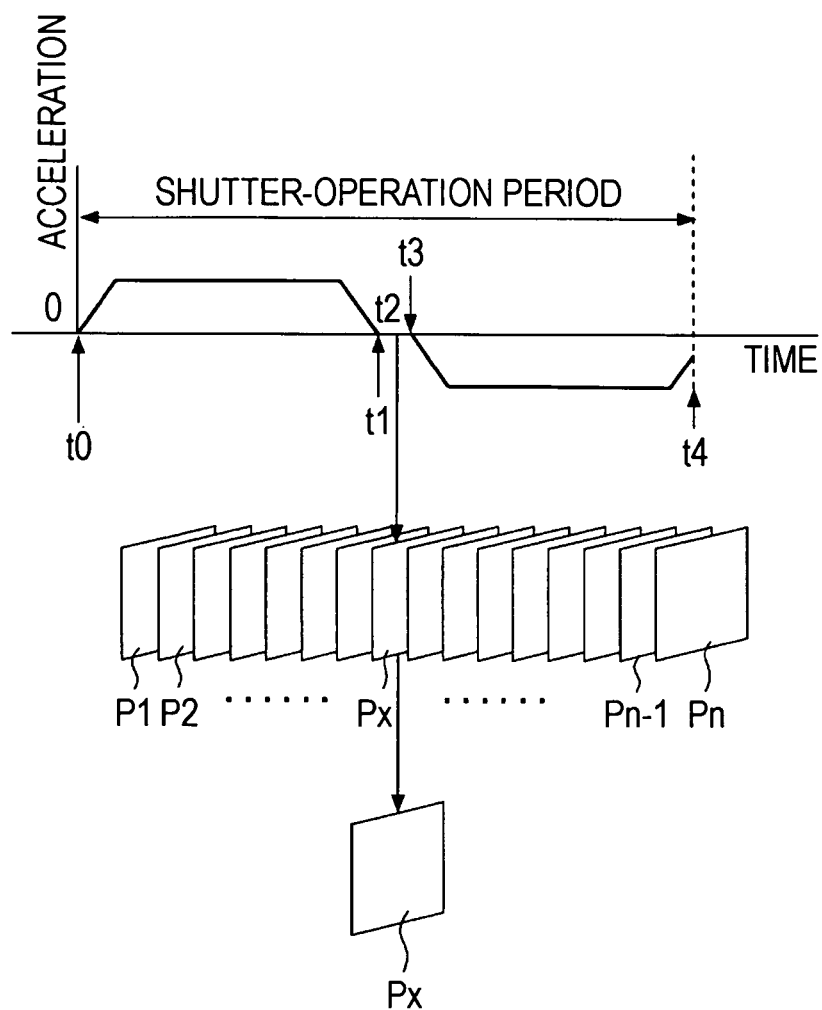
FIG. 2 is an explanatory diagram of a first example of an image-pickup-process operation performed by the image-pickup apparatus according to the embodiment.

FIG. 2 shows a change in detected value showing the acceleration of the image-pickup apparatus 1 in movements in the upward and downward directions, which was detected by the acceleration sensor 8 while a user was performing a shutter operation. In FIG. 2, the horizontal axis represents time, and the vertical axis represents the detected value of the acceleration. A change in detected value depicted at a position above the time axis shows the acceleration of the image-pickup apparatus 1 in a movement in the downward direction, and a change in detected value depicted at a position below the time axis shows the acceleration of the image-pickup apparatus 1 in a movement in the upward direction.

In FIG. 2, the acceleration in a case in which the image-pickup apparatus 1 moved in the upward and downward directions is shown. However, the acceleration in a case in which the image-pickup apparatus 1 moves in the left and right directions may be shown in the same manner.

A time at which the user started the shutter operation is shown as a time t0, and a time at which the user finished the shutter operation is shown as a time t4. A period from the time t0 and the time t4 is shown as a shutter-operation period. The shutter-operation period is a period of, for example, about 0.5 seconds to 2 seconds.

FIG. 2 shows as the following states: From the time t0, at which the user started the shutter operation, a movement of the image-pickup apparatus 1 appeared, for example, due to influence of camera shake caused by a hand movement that occurred in a case in which a shutter key was pressed, and the detected value of the acceleration in the downward direction increased; After that, the detected value of the acceleration became zero at a time t1; Then, the movement of the image-pickup apparatus 1 appeared at a time t3 again, and the detected value of the acceleration in the upward direction increased; and After that, the shutter operation finished at the time t4.

Generally, when a user performs a shutter operation, in order to prevent the image-pickup apparatus 1 from being moved by influence of camera shake caused by a hand movement, the user tries to hold the image-pickup apparatus 1 fixed in place, and performs a pickup of an image. However, when the user performs the shutter operation in reality, camera shake caused by a hand movement occurs to some extent in some cases. Additionally, because the user takes a posture capable of preventing the image-pickup apparatus 1 from moving, the detected value of the acceleration of the image-pickup apparatus 1 in movements changes as shown in FIG. 2 in many cases.

In a typical image-pickup apparatus, a shutter process is performed in response to a shutter operation. The shutter process is a process of storing an image in a frame that is picked up at the time of the performance of the shutter operation. Regarding an operation in which the shutter process is performed in response to the shutter operation, referring to FIG. 2, the system controller 2 issues an instruction for performance of the shutter process to the image-pickup-control section 4 and the storage section 9 at the time t0 at which starting of the shutter operation was detected. However, because a time lag between a control and the process occurs in this case, for example, a picked-up-image-data item in one frame that is picked up at a time at which the acceleration is increasing may be stored as a still image that is an image-pickup result. In other words, an image suffering from image shake may be stored.

For this reason, in this embodiment, first, the system controller 2 causes the temporary-memory section 12 to temporarily retain picked-up-image-data items that were picked up by the image-pickup section 3 in the shutter-operation period from the time t0, at which starting of the shutter operation was detected, to the time t4, at which the user finished the shutter operation. Picked-up-image-data items P1 to Pn shown in FIG. 2 are picked-up-image-data items each of which is obtained in a corresponding frame in the shutter-operation period. The system controller 2 causes the temporary-memory section 12 to temporarily retain the picked-up-image-data items P1 to Pn.

For example, approximately how many frames, in which picked-up-image-data items are included, can be obtained in the shutter-operation period, which is a period of about one second, is also based on a setting of the frame rate that is set in the image-pickup element 3b. Additionally, instead of temporarily retaining all of the frames, image data items in non-consecutive frames, such as every second frame or every third frame, may be stored in the temporary-memory section 12.

After the shutter-operation period is finished, the system controller 2 selects, from among the picked-up-image-data items in a plurality of frames that the temporary-memory section 12 is caused to retain, a picked-up-image-data item in one frame to be stored, on the basis of detected values that were detected by the acceleration sensor 8 in the shutter operation period. In this example, the system controller 2 selects a picked-up-image-data item Px that was extracted at a time t2, at which a detected value became zero, from among the picked-up image data items that temporary-memory section 12 is caused to retain, and performs control of causing the storage section 9 to record the picked-up-image-data item Px.

At the time t2, at which a detected value became zero, the imaging apparatus 1 was in a state without any camera shake caused by a hand movement, in which the movement of the image-pickup apparatus 1 was stopped. Accordingly, the system controller 2 performs the control of causing the storage section 9 to record the picked-up-image-data item Px that was picked up at the time, whereby a picked-up image data item that is less influenced by camera shake caused by a hand movement can be stored as an image of an object.

There may be a case in which no detected value of the acceleration of the image-pickup apparatus 1 in a movement is zero in the period in which the user is performing the shutter operation. In such a case, only picked-up image data items that were picked up in a case in which the image-pickup apparatus 1 was moving are retained in the temporary-memory section 12. Accordingly, the system controller 2 is not able to cause the storage section 9 to record a picked-up image data item that does not suffer from image shake.

In this case, the system controller 2 performs control of causing the sound-output section 10 to output a warning sound or a sound indicating a warning message warning that the image-pickup apparatus 1 is moving, thereby performing notification to the user.

Processes that are performed by the system controller 2 in order to realize the foregoing operation will be described with reference to FIG. 3.

Figure 3:
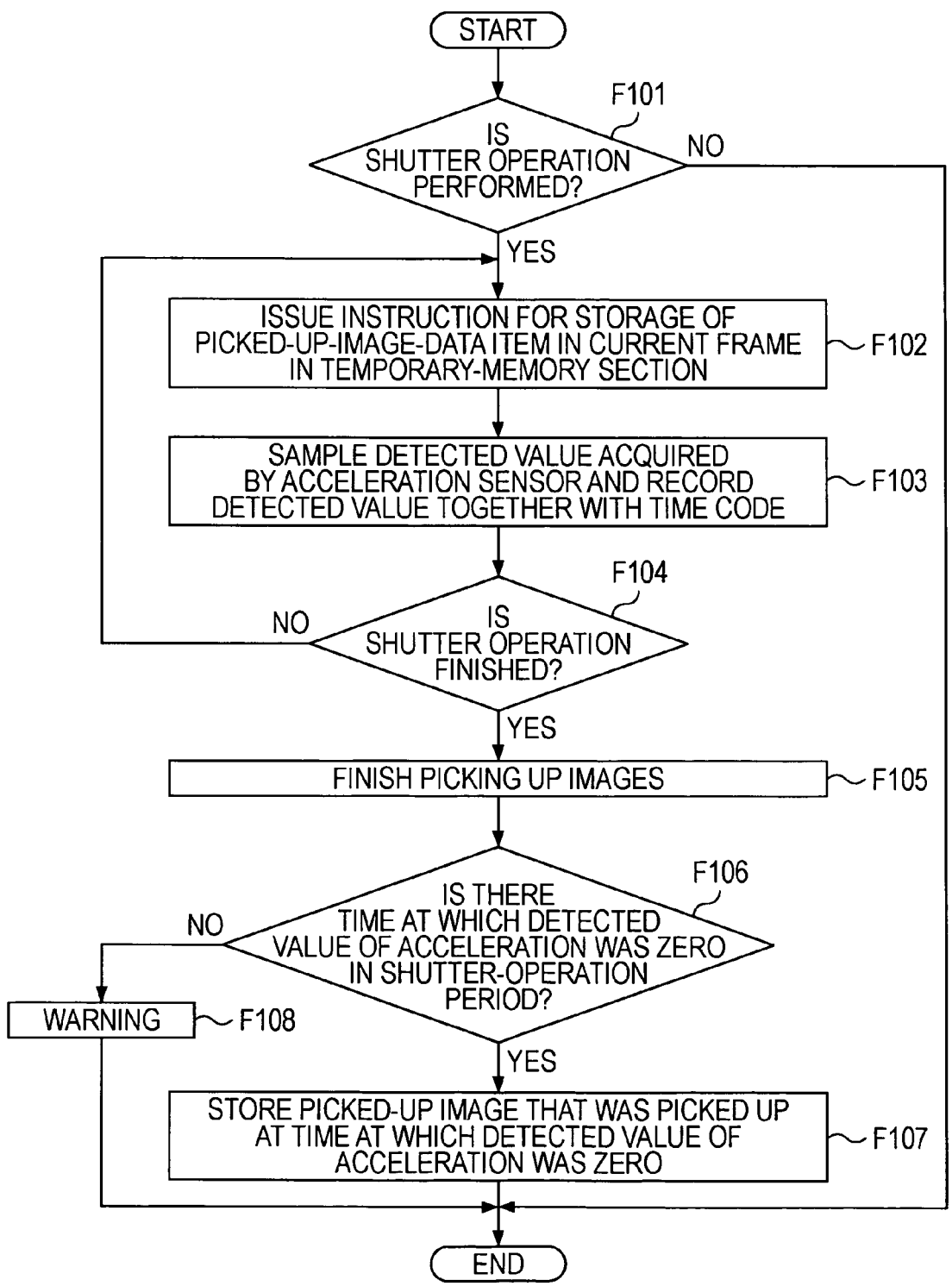
FIG. 3 is a flowchart of the first example of the image-pickup-process operation according to the embodiment.
Figure 5:
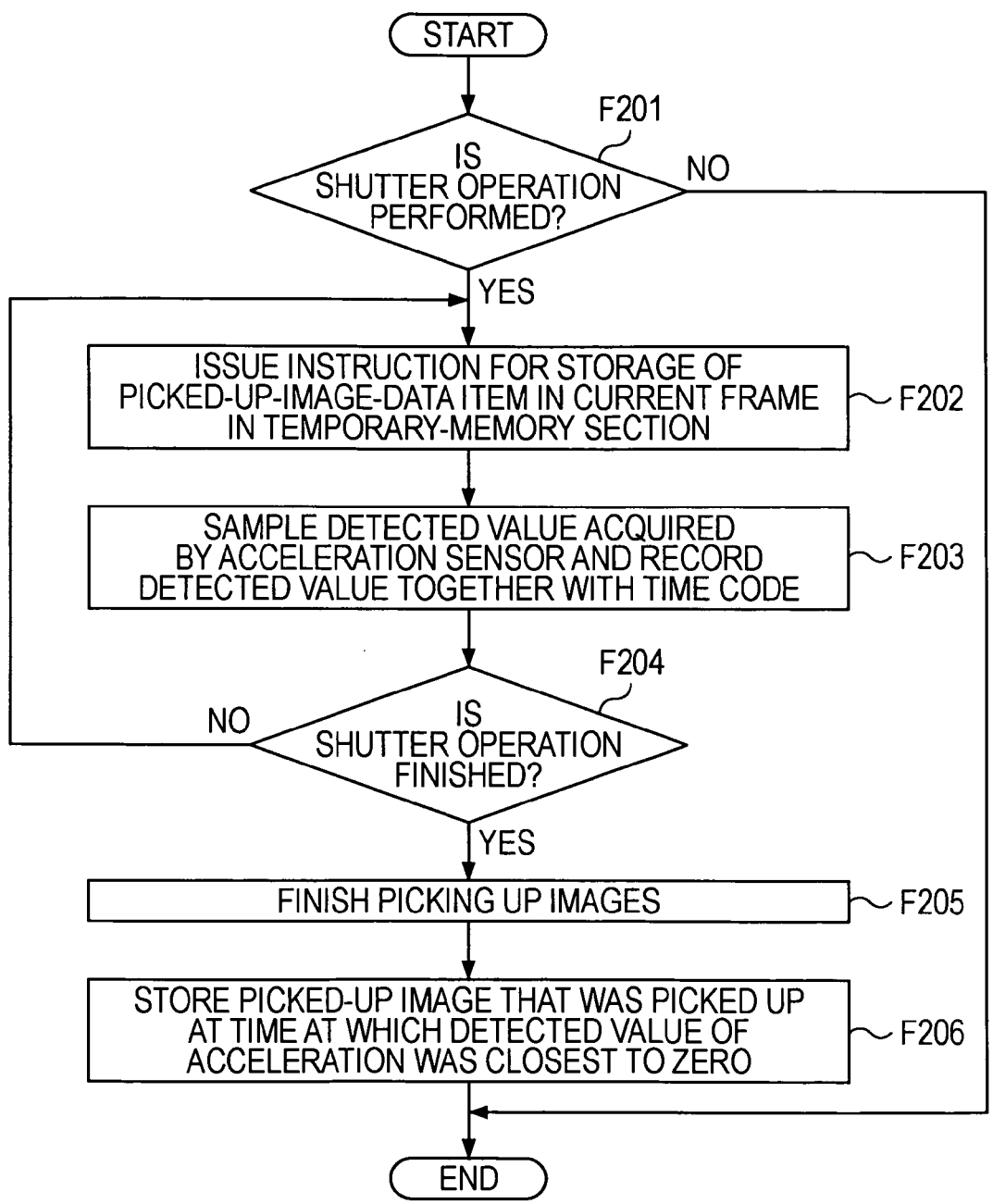
FIG. 5 is a flowchart of the second example of the image-pickup-process operation according to the embodiment.
Figure 7:
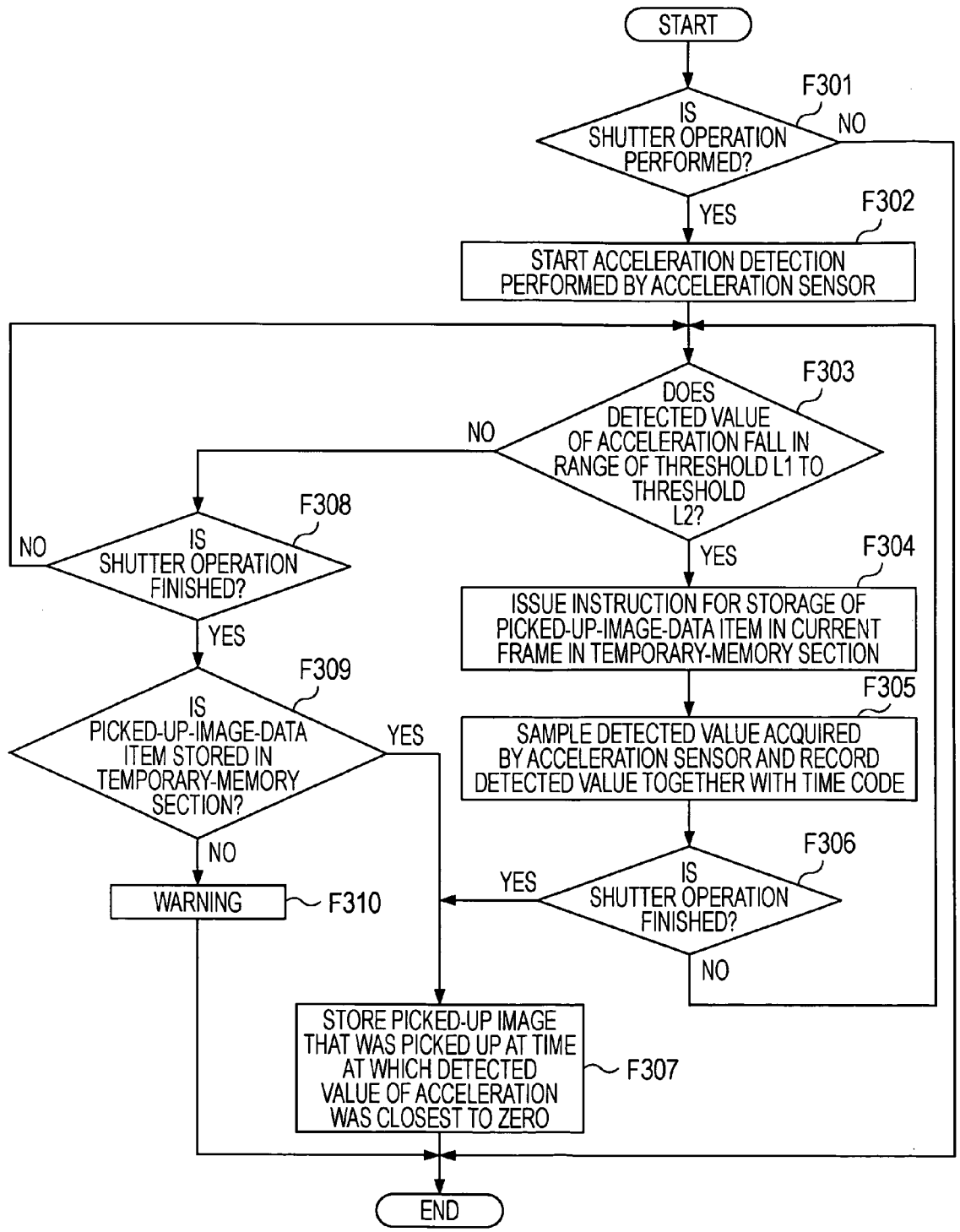
FIG. 7 is a flowchart of the third example of the image-pickup-process operation according to the embodiment.

The processes shown in FIG. 3 are performed on the basis of the program stored in the ROM that is built in the system controller 2 (processes shown in FIGS. 5 and 7, which are described below, are performed in the same manner).

In step F101, a process of monitoring a shutter operation performed by the user is being performed. When a shutter operation is being performed by the user, the system controller 2 proceeds to step F102.

In step F102, the system controller 2 issues an instruction for storage of a picked-up-image-data item in the temporary-memory section 12. In other words, the system controller 2 causes the temporary-memory section 12 to store a picked-up-image-data item, which is being picked up at the present time, in the current frame. In this case, the picked-up-image-data item in the current frame is stored in the temporary-memory section 12 in a state in which a time code is attached to the picked-up-image-data item in one frame that was extracted by the image-pickup-control section 4.

The time code may be, for example, time information in which a picked-up-image-data item in one frame that is extracted first after the shutter operation was started is labeled as having been picked up at "0 minutes, 0 seconds, and 0 frames".

Next, in step F103, the system controller 2 performs sampling of a detected value that was detected by the acceleration sensor 8, and records the detected value together with the time code. In other words, the system controller 2 samples a detected value of the acceleration supplied from the acceleration sensor 8, and records the detected value of the acceleration, for example, in an internal memory in a state in which the detected value of the acceleration corresponds to the time code that is attached to the picked-up-image-data item in one frame.

In step F104, the system controller 2 determines whether or not the shouter operation has finished. In other words, the system controller 2 determines whether or not the shutter key of the operation-input section 7 is in a state in which it is released by the user (whether or not shutter-key operation is not detected any more). While the shutter operation is still being performed, the system controller 2 returns to step F102.

Accordingly, in the shutter-operation period, the processes of steps F102→F103→F104→F102→F103→F104 . . . are to be repeated.

Thus, the picked-up-image-data items P1, P2, . . . , Px, Pn-1, and Pn are to be retained in the temporary-memory section 12. The system controller 2 is to store detected values of the acceleration each of which is obtained at an image-pickup time at which a corresponding one of the picked-up-image-data items P1, P2, . . . , Px, . . . , Pn-1, and Pn is picked up.

At a certain time, when a determination result indicating that the shutter operation has finished is obtained in step F104, the system controller 2 proceeds to step F105.

In step F105, in response to the determination result in step F104, which indicates that the shutter operation has finished, the system controller 2 finishes issuing the instruction for temporary retention of a picked-up-image-data item extracted by the imaging-control section 4. The system controller 2 also finishes sampling a detected value of the acceleration supplied from the acceleration sensor 8. The system controller 2 proceeds to step F106.

In step F106, the system controller 2 determines whether or not there is any time at which a detected value of the acceleration was zero in the shutter-operation period. In other words, the system controller 2 checks the detected values of the acceleration, which are stored in the internal memory as a result of the process of step F103, obtained at corresponding times, i.e., the detected values of the acceleration corresponding to the picked-up-image-data items P1, P2, . . . , Px, . . . , Pn-1, and Pn, to determine whether or not there is any time at which a detected value was zero (whether or not there is any temporarily retained picked-up-image-data item corresponding to a time at which a detected value was zero). When there is a picked-up-image-data item that was extracted at a time at which a detected value was zero, the system controller 2 proceeds to step F107.

In step F107, the system controller 2 performs control of storing a picked-up-image-data item that was picked up at a time at which a detected value of the acceleration was zero. In other words, the system controller 2 determines a time code that is recorded together with information showing that a detected value was zero, which is determined in step F106. Then, the system controller 2 transfers a picked-up-image-data item to which a time code the same as the time code is attached from the temporary-memory section 12 to the storage section 9, and performs a process of causing the storage section 9 to record the picked-up-image-data item.

For example, referring to FIG. 2, from among the picked-up-image-data items P1 to Pn that were extracted in the shutter-operation period, it is determined using the time code that a picked-up-image-data item that was extracted at the time t2, at which a detected value was zero, is the picked-up-image-data item Px. The system controller 2 transfers the picked-up-image-data item Px from the temporary-memory section 12 to the storage section 9, and causes the storage section 9 to record the picked-up-image-data item Px. The picked-up-image-data item Px is recorded in the storage section 9, resulting in storage of a picked-up-image-data item that was obtained in response to the shutter operation performed by the user. Thus, "photography" is performed as an instruction provided by the user using the shutter operation.

When there are a plurality of picked-up-image-data items corresponding to times at which detected values were zero, a condition for a picked-up-image-data item that the storage section 9 is caused to record may be determined in advance. For example, when there are a plurality of picked-up-image-data items corresponding to times at which detected values were zero, the condition may be set so that the system controller 2 can select a picked-up-image-data item whose time code has the smallest value or the largest value from among the plurality of picked-up-image-data items, and so that the system controller 2 can cause the storage section 9 to record the picked-up-image-data item. Alternatively, when there are a plurality of picked-up-image-data items that were extracted, the condition may be set so that system controller 2 selects a picked-up-image-data item that was extracted at the midpoint of the times, and so that the system controller 2 can cause the storage section 9 to record the picked-up-image-data item.

Furthermore, there may be a case in which no detected value of the acceleration was zero in the shutter-operation period. In such a case, the system controller 2 proceeds from step F106 to step F108.

In step F108, the system controller 2 performs a warning process. In other words, the system controller 2 performs a process of causing the sound-output section 10 to output a warning sound or a sound indicating a message warning that the movement of the image-pickup apparatus 1 was not stopped.

In this case, it is only necessary that the system controller 2 notify the user that the system controller 2 was not able to extract any picked-up-image-data item corresponding to a time at which a detected value of the acceleration was zero because the movement of the image-pickup apparatus 1 was not stopped, and that system controller 2 is not able to record any picked-up-image-data item that does not suffer from image shake.

For example, it is only necessary that it be recognized by the user that the warning sound is a sound indicating a failure of the pickup of an image. Alternatively, a message sound, such as "The pickup of an image was not successful. Please push the shutter button with caution to camera shake caused by a hand movement", may be output using speech synthesis.

The picked-up-image-data items stored in the temporary-memory section 12 are erased at an arbitrary time after the process of step F107 is performed or after the process of step F108 is performed.

Accordingly, because the system controller 2 performs the above-described processes shown in FIG. 3, even when the image-pickup apparatus 1 is moved due to camera shake caused by a hand movement in a period in which a user is performing a shutter operation, the image-pickup apparatus 1 can store a picked-up-image-data item that was extracted at a time at which the movement of the image-pickup apparatus 1 was stopped from among picked-up-image-data items that were extracted in the period. In other words, the user can obtain a picked-up-image-data item that is not influenced by camera shake caused by a hand movement as a photograph image obtained in response to the shutter operation.

Additionally, in order to realize the function of avoiding camera shake caused by a hand movement, no mechanism for avoiding camera shake is newly provided, or no correction of image shake is performed using picked-up-image-signal processing. Thus, it is not necessary that a large mechanism be added to the image-pickup apparatus 1 or that the processing load of the image-pickup apparatus 1 be increased. Therefore, the processes can be simplified, and the function can be realized at a low cost.

3. Second Example of Image-Pickup-Process Operation

In the above-described picked-up-image-selecting-process operation in which the prevention of camera shake caused by a hand movement is realized, the system controller 2 extracts picked-up-image-data items on the basis of a predetermined setting in a period in which a user is performing a shutter operation, and performs control of the process in which a picked-up-image-data item that was picked up at a time at which a detected value of the acceleration of the image-pickup apparatus 1 in a movement was zero is stored.

However, when the operation is performed in reality, there is a probability that the shutter operation performed by the user finishes without obtaining any detected value that is zero in the period in which the user is performing the shutter operation. In such a case, in the above-described picked-up-image-selecting-process operation, the system controller 2 does not perform the control of the process of causing the storage section 9 to store a picked-up-image-data item. In other words, "photography" is not performed as an instruction provided by the user using the shutter operation.

However, suppose that a picked-up-image-data item obtained only in a case in which the acceleration precisely becomes zero is to be stored. In such a case, there is a high probability that, even when a shutter operation is performed, no picked-up-image-data item is stored, i.e., the "photography" is not performed.

For this reason, even when no detected value of the acceleration of the image-pickup apparatus 1 in a movement is zero in the period in which the user is performing the shutter operation, a process may be performed, in which, from among picked-up-image-data items that were picked up and extracted in the shutter-operation period, a picked-up-image-data item that was picked up at a time at which a detected value was closest to zero is stored.

Generally, when a user performs a shutter operation, the user tries to hold the image-pickup apparatus 1 fixed in place in order to prevent the image-pickup apparatus 1 from being moved by influence of camera shake caused by a hand movement or the like, and performs a pickup of an image. Accordingly, there is a low possibility that a considerably large camera shake occurs. When a picked-up-image-data item is a picked-up-image-data item that was picked up at a time at which a detected value was closest to zero, the picked-up-image-data item can be obtained as a still image having an image quality with which the user is satisfied.

Such a picked-up-image-selecting-process operation will be described below.

Figure 4:
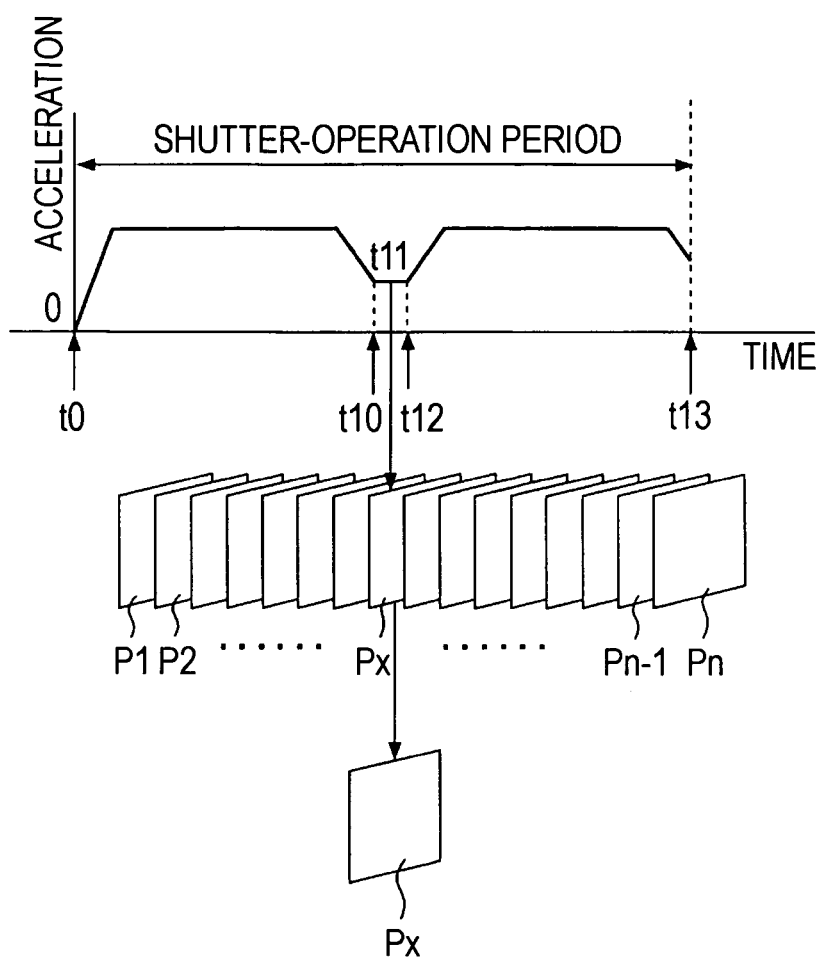
FIG. 4 is an explanatory diagram of a second example of the image-pickup-process operation performed by the image-pickup apparatus according to the embodiment.

FIG. 4 shows a change in detected value of the acceleration of the image-pickup apparatus 1 in a movement in the downward direction, which was detected by the acceleration sensor 8 while a user was performing a shutter operation. In FIG. 4, the horizontal axis represents time, and the vertical axis represents the detected value of the acceleration, as in the case of FIG. 2.

A period from the time to a time t13 was a period in which the user was performing the shutter operation. The shutter-operation period is a period of, for example, about 0.5 seconds to 2 seconds, as in the case of the shutter-operation period shown in FIG. 2.

FIG. 4 shows as follows: From the time t0, at which the user started the shutter operation, the detected value of the acceleration in the downward direction started increasing; After that, the detected value of the acceleration became most closest to zero at a time t10, and remained constant until a time t12; Then, the detected value of the acceleration in the downward direction started increasing again from the time t12; and The shutter-operation period finished at the time t13.

Also in a case of FIG. 4, as in the case of FIG. 2, the system controller 2 causes the image-pickup-control section 4 to extract a picked-up-image-data item in one frame as a still image on the basis of a predetermined setting in the shutter-operation period. Then, the system controller 2 causes the temporary-memory section 12 to temporarily retain extracted picked-up-image-data items P1 to Pn that are shown in FIG. 4, i.e., a plurality of picked-up-image-data items.

The system controller 2 performs control of causing the storage section 9 to record a picked-up-image-data item Px that was extracted at a time t11, at which a detected value was closest to zero, from among the picked-up-image-data items that the temporary-memory section 12 is caused to retain.

Accordingly, the picked-up-image-data item that was extracted at the time t11, at which a detected value was closest to zero, can be stored as a picked-up-image-data item as less influenced by camera shake caused by a hand movement as possible.

Processes that are performed by the system controller 2 in order to realize the foregoing operation will be described with reference to FIG. 5.

First, as the processes of steps F201 to F205, processes similar to those of steps F101 to F105 shown in FIG. 3 are performed.

In other words, in step F201, the system controller 2 performs a process of determining whether or not the shutter operation is being performed by the user. When the shutter operation is being performed, the processes of steps F202 and F203 are to be repeated until the shutter operation finishes, and the system controller 2 is to retain picked-up-image-data items in a plurality of frames, each of which is obtained at a corresponding time, in the temporary-memory section 12. The system controller 2 is to store detected values of the acceleration, each of which is obtained at an image-pickup time of a picked-up-image-data item in a corresponding frame, together with time codes in the internal memory.

Then, in step F204, the system controller 2 performs a process of determining whether or not the shutter operation has finished. When a determination result indicating the shutter operation has finished is obtained, the system controller 2 finishes extraction of a picked-up-image-data item from the image-pickup-control section 4 to the temporary-memory section 12, and also finishes sampling a detected value of the acceleration. After that, the system controller 2 proceeds to step F206.

In step F206, the system controller 2 stores a picked-up-image-data item that was extracted at a time at which a detected value of the acceleration was closest to zero. In other words, the system controller 2 determines a time at which a detected value was closest to zero using the sampled detected values recorded in the internal memory of the system controller 2. Then, the system controller 2 determines a time code corresponding to the detected value, and selects a picked-up-image-data item to which a time code the same as the time code is attached from among the picked-up-image-data items stored in the temporary-memory section 12. After that, the system controller 2 transfers the picked-up-image-data item to the storage section 9, and performs control of a process of causing the storage section 9 to record the picked-up-image-data item.

For example, referring to FIG. 4, first, the picked-up-image-data items P1 to Pn are extracted in the shutter-operation period, and then are retained in the temporary-memory section 12. Because the picked-up-image-data item that was extracted at the time till, at which a detected value was closest to zero, is the picked-up-image-data item Px, the system controller 2 transfers the picked-up-image-data item Px from the temporary-memory section 12 to the storage section 9, and causes the storage section 9 to record the picked-up-image-data item Px.

In this manner, "photography" is performed as an instruction provided by the user using the shutter operation.

When there are a plurality of picked-up-image-data items were extracted at times at which detected values were closest to zero, as in the case described with reference to FIG. 2, a condition for a picked-up-image-data item that the storage section 9 is caused to record may be determined in advance.

The picked-up-image-data items retained in the temporary-memory section 12 are erased at an arbitrary time after the process of step F206 is performed.

In the forgoing picked-up-image-selecting-process operation in which camera shake caused by a hand movement is avoided, even when the image-pickup apparatus 1 is moved due to camera shake caused by a hand movement in a shutter-operation period, a picked-up-image-data item that was picked up in a state closest to a state in which the movement of the image-pickup apparatus 1 was stopped can be stored. Thus, a picked-up-image-data item having an image quality, with which a user is satisfied, for an image of an object can be stored even when the picked-up-image-data item suffers from fine image shake.

Furthermore, because "photography" is performed as an instruction provided by the user using the shutter operation even when no detected value was zero, for the user, the probability that "photography" with a desired image quality is successfully achieved becomes high. Thus, the picked-up-image-selecting-process operation is an advantageous process operation.

4. Third Example of Image-Pickup-Process Operation

In the first and second examples of the image-pickup-process operation that have been described, in a period in which a user was performing a shutter operation, picked-up-image-data items in frames that were obtained at corresponding times are temporarily retained in the temporary-memory section 12. After that, a picked-up-image-data item that was extracted at a time at which a detected value of the acceleration of the image-pickup apparatus 1 in a movement was zero or at which a detected value was closest to zero is selected, and the picked-up-image-data item is stored in the storage section 9.

Other than the forgoing processes, a process method can be provided, in which picked-up-image-data items that are to be retained in the temporary-memory section 12 are also selected on the basis of values detected by the acceleration sensor 8.

Figure 6:
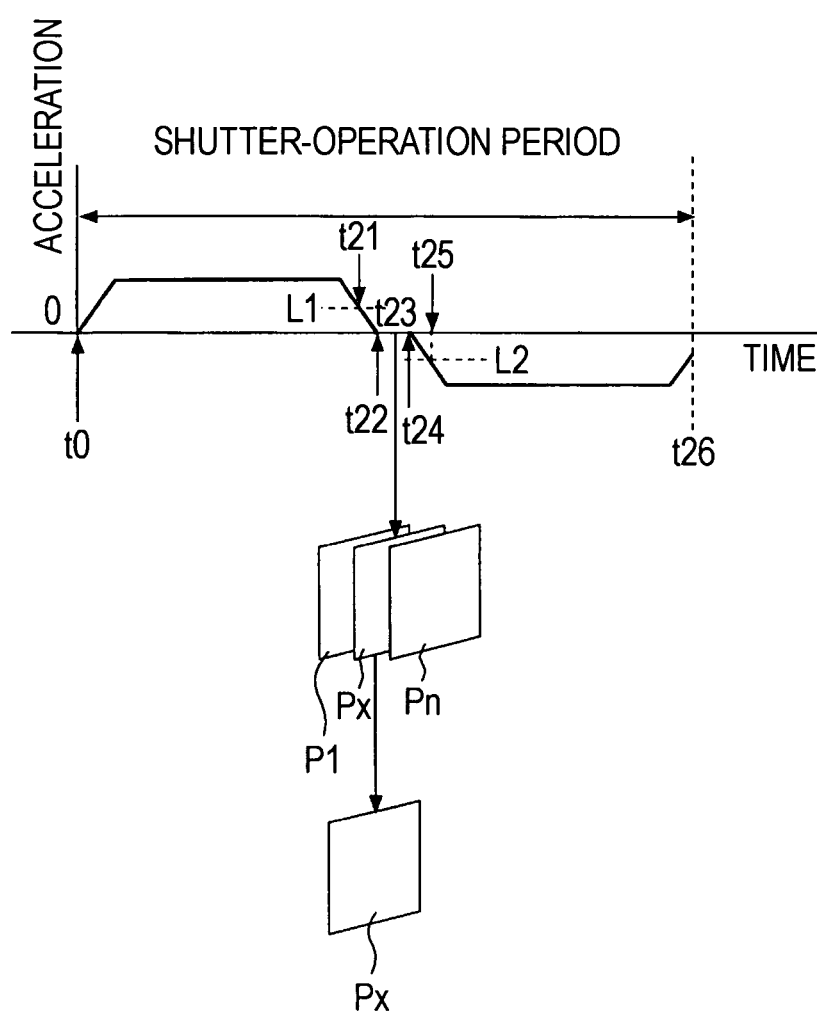
FIG. 6 is an explanatory diagram of a third example of the image-pickup-process operation performed by the image-pickup apparatus according to the embodiment.

FIG. 6 shows a change in detected value of the acceleration of the image-pickup apparatus 1 in movements in the upward and downward directions, which was detected by the acceleration sensor 8 in a period in which a shutter operation was being performed by a user, as in the case of FIG. 2 that has been described above.

Additionally, the shutter-operation period, for example, about 0.5 seconds to 2 seconds, as in the cases of FIGS. 2 and 4.

FIG. 6 shows the following states: From the time t0 at which the user started the shutter operation, the detected value of the acceleration of the image-pickup apparatus 1 in the downward direction increased; After that, the detected value became zero at a time t22, and remained constant as zero until a time t24; Then, in contrast, from the time t24, the detected value of the acceleration in the upward direction increased; and After that, the shutter operation finished at a time t26.

In this example, which is different from the above-described examples shown in FIGS. 2 and 4, when picked-up-image-data items are to be extracted in the shutter-operation period, a period used to extract and temporarily retain the picked-up-image-data items is determined on the basis of detected values of the acceleration.

In other words, as shown in FIG. 6, for example, thresholds L1 and L2 that are close to a value indicating an acceleration of zero are set. Picked-up-image-data items in corresponding frames that were obtained in a period in which detected values of the acceleration fell between the threshold L1 and the threshold L2 are retained in the temporary-memory section 12. For example, in FIG. 6, in a period from a time t21 to a time t25, detected values of the acceleration fell in the range of the threshold L1 to the threshold L2. In this period, the system controller 2 causes the image-pickup-control section 4 to extract picked-up-image-data items P1 to Pn in corresponding frames as still images, and stores the picked-up-image-data items P1 to Pn in the temporary-memory section 12.

The two thresholds L1 and L2 are detected values that are arbitrarily set in advance, and that are to some content close to the value indicating an acceleration of zero. The picked-up-image-data items P1 to Pn that were extracted times at which detected values were sampled between the two thresholds are picked-up-image-data items obtained as still images that are comparatively less influenced by camera shake caused by a hand movement.

The system controller 2 selects a picked-up-image-data item that was picked up at a time at which a detected value of the acceleration was closest to zero from among the picked-up-image-data items P1 to Pn that are retained in the temporary-memory section 12, transfers the picked-up-image-data item to the storage section 9, and performs control of causing the storage section 9 to record the picked-up-image-data item. For example, in FIG. 6, a picked-up-image-data item Px that was extracted at a time 23 at which a detected value was zero is selected, and recorded in the storage section 9.

In this manner, the picked-up-image-data items obtained in the period corresponding to the range of the threshold L1 to the threshold L2 can be extracted, whereby a picked-up-image-data item that was picked up at a time at which the minimum detected value was obtained can be efficiently selected. Thus, a picked-up-image-data item as less influenced by camera shake caused by a hand movement as possible can be stored.

Processes that are performed by the system controller 2 in order to realize the foregoing operation will be described with reference to FIG. 7.

First, in step F301, the system controller 2 performs a process of determining whether or not a shutter operation is being performed by the user. When a shutter operation is being performed by the user, the system controller 2 proceeds to step F302.

In step F302, the system controller 2 starts sampling a detected value of the acceleration supplied from the acceleration sensor 8.

Then, in step F303, the system controller 2 performs a process of determining whether or not the detected value of the acceleration was in the range of the threshold L1 to the threshold L2, and monitors finishing of the shutter operation.

In step F303, when a determination result indicating that the detected value of the acceleration was not in the range of the threshold L1 to the threshold L2 is obtained, the system controller 2 proceeds to step F308, and performs a process of determining whether or not the shutter operation has finished. When a determination result indicating that the shutter operation has not finished is obtained, the system controller 2 returns to step F303. The system controller 2 is to repeat the processes of step F303→F308→F303 . . . until a result indicating that a detected value of the acceleration was in the range of the threshold L1 to the threshold L2 is obtained.

When a detected value of the acceleration was in the range of the threshold L1 to the threshold L2 in the shutter-operation period, the system controller 2 proceeds to step F304.

In steps F304 and F305, processes similar to those of steps F102 and F103 shown in FIG. 3 are performed. In other words, first, in step F304, the system controller 2 attaches a time code to a picked-up-image-data item in the current frame, and causes the temporary-memory section 12 to retain the picked-up-image-data item. In step F305, the system controller 2 records the detected value of the acceleration in the internal memory in a state in which the detected value of the acceleration corresponds to the time code.

In step F306, the system controller 2 performs a process of determining whether or not the shutter operation has finished. When the shutter operation has not finished, the system controller 2 returns to step F303.

When, at a certain time, a determination result indicating that the shutter operation has finished is obtained in step F308, the system controller 2 performs a process of determining, in step F309, whether or not a picked-up-image-data item is temporarily stored in the temporary-memory section 12.

In other words, the system controller 2 performs a determination process of determining whether or not at least one picked-up-image-data item is retained in the temporary-memory section 12 as a result of the process of step F304 because a detected value of the acceleration is sampled in the range of the threshold L1 to the threshold L2 at least one time. When a result indicating that a picked-up-image-data item is retained in the temporary-memory section 12 is obtained in the determination process, the system controller 2 proceeds to step F307.

When it is detected in step F306 that the shutter operation has finished, because at least one picked-up-image-data item is retained in the temporary-memory section 12 as a result of the process of step F304, the system controller 2 proceeds to step F307.

In step F307, the system controller 2 selects a picked-up-image-data item that was obtained at a time at which a detected value of the acceleration was closest to zero from among picked-up-image-data items that are temporarily retained, and performs a process of storing the picked-up-image-data item.

In other words, the system controller 2 determines a time at which a detected value was closest to zero using sampled detected values that are recorded in the internal memory of the system controller 2. Then, the system controller 2 determines a time code corresponding to the detected value, and selects a picked-up-image-data item to which a time code the same as the time code is attached from among the picked-up-image-data items retained in the temporary-memory section 12. The system controller 2 transfers the picked-up-image-data item to the storage section 9, and performs a process of causing the storage section 9 to record the picked-up-image-data item.

For example, referring to FIG. 6, the picked-up-image-data items P1 to Pn that were extracted at times at which detected values were in the range of the threshold L1 to the threshold L2 in the shutter operation, and are retained in the temporary-memory section 12. In this case, a picked-up-image-data item that was extracted at a time at which a detected value was closest to zero is the picked-up-image-data item Px that was extracted at the time t23 at which a detected value was zero. The system controller 2 transfers the picked-up-image-data item Px from the temporary-memory section 12 to the storage section 9, and causes the storage section 9 to record the picked-up-image-data item Px.

In this manner, "photography" is performed as an instruction provided by the user using the shutter operation.

For confirmation, in the example shown in FIG. 6, the picked-up-image-data item that the storage section 9 is caused to record was a picked-up-image-data item that were extracted at time at which a detected value was zero. When there is no time at which a detected value was zero, the system controller 2 may select a picked-up-image-data item that was extracted at a time which a detected value was closest to zero as a picked-up-image-data item to be stored.

When there are a plurality of picked-up-image-data items were extracted at times at which detected values were closest to zero or at which detected values were zero, as in the cases described with reference to FIGS. 2 and 4, a condition for a picked-up-image-data item that the storage section 9 is caused to record may be determined in advance.

The picked-up-image-data items retained in the temporary-memory section 12 are erased at an arbitrary time after the process of step F307 or F310 is performed.

When camera shake caused by a hand movement is strong, no detected value of the acceleration may fall in the range of the threshold L1 to the threshold L2 in the shutter-operation period. In such a case, because the process of step F304 is not performed in the shutter-operation period, a determination result indicating that no picked-up-image-data item is retained in the temporary-memory section 12 is obtained in step F309. In this case, in step F310, the system controller 2 performs a warning process similar to that of step F108 shown in FIG. 3.

For example, the system controller 2 may cause the sound-output section 10 to output a warning sound causing the user to recognize that the warning sound is a sound indicating a failure of the pickup of an image. Alternatively, the system controller 2 may cause the sound-output section 10 to output a message sound, such as "The pickup of an image was not successful. Please push the shutter button with caution to camera shake caused by a hand movement".

Also by performing the above-described image-pickup-process operation, positive effects similar to those obtained in the first and second examples of the image-pickup-process operation can be obtained. Thus, "photography" capable of avoiding the influence caused by camera shake can be performed.

5. Modifications

The embodiments of the present invention have been described above. However, the present invention is not limited to the embodiments that have been described above.

For example, regarding the above-described image-pickup-process operations of avoiding the influence caused by camera shake, a function of avoiding camera shake may be capable of being optionally turned on/off using a mode operation performed by a user. When the function of avoiding camera shake is turned off, the system controller 2 issues a shutter instruction immediately in response to a shutter operation performed by the user, and performs control of a process of obtaining a picked-up-image-data item in response to the shutter operation.

For example, suppose that the user, who is an image-pickup operator, intends to obtain a picked-up-image-data item suffering from image shake. In such a case, it is preferable that the user perform the mode operation using the operation-input section 7 to turn off the function of avoiding camera shake caused by a hand movement, which is described in the forgoing process examples.

Additionally, regarding a warning output, in the examples, a warning is issued as a sound output from the sound-output section 10. However, a warning may be issued as light emitted by a light-emitting element, such as a light-emitting diode (LED). Alternatively, a message may be displayed on the display section 5.

Furthermore, there may be a process example without any warning output.

In addition, the system controller 2 causes the temporary-memory section 12 to temporarily retain picked-up-image-data items that were extracted by the imaging-control section 4. However, the system controller 2 may cause a volatile memory, such as the RAM provided inside the system controller 2, to temporarily retain the picked-up-image-data items.

In order to determine and select a picked-up-image-data item that was extracted at a time at which a detected value was zero or at which a detected value was closest to zero from among picked-up-image-data items that were extracted, the system controller 2 records detected values and time codes, in which relative time information was recorded in synchronization with the detected values, in the internal memory. Additionally, the system controller 2 attaches the time codes to the picked-up-image-data items, and causes the temporary-memory section 12 to retain the picked-up-image-data items.

Instead of storing the detected values and the time codes in the internal memory of the system controller 2, the system controller 2 may attach the detected values of the acceleration to the picked-up-image-data items that are to be used to determine or select a picked-up-image-data item.

In other words, first, the system controller 2 attaches information concerning the detected values corresponding to times at which the picked-up-image-data items were extracted to the picked-up-image-data items, and causes the temporary-memory section 12 to retain the picked-up-image-data items. Next, the system controller 2 checks the information concerning the detected values, which is attached to the picked-up-image-data items, and selects a picked-up-image-data item that was extracted at a time at which a detected value was zero or at which a detected value was closest to zero. Then, the system controller 2 causes the storage section 9 to record the selected picked-up-image-data item.

Additionally, as a process performed in response to the shutter instruction, a storage process is performed, in which an image in one frame that was extracted by the imaging-control section 4 is stored in the storage section 9 as a picked-up-still-image-data item. In the storage process, a picked-up-image-data item may be sent to external equipment. In other words, a sending unit for the external equipment may be provided, and an operation of sending a picked-up-image-data item and causing the external equipment to store the picked-up-image-data item may be included in the storage process according to any of the embodiments of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An image-pickup apparatus comprising:
    image-pickup means for picking up a plurality of images of an object during a shutter operation period;
    retaining means for temporarily retaining at least some of the plurality of images;
    storage-process means for storing at least one image selected from the images temporarily retained in the retaining means;
    motion-detecting means for detecting acceleration of the image-pickup apparatus; and
    control means for causing storing, by the storage-process means, of the at least one image selected from the images temporarily retained in the retaining means based on an acceleration value obtained by the motion-detecting means during the shutter-operation period, wherein the control means includes means for identifying at least one sub-period within the shutter operation period during which the image-pickup apparatus experienced less than a threshold level of acceleration, and further includes means for causing the retaining means to temporarily retain at least some of the plurality of images that were picked up during the at least one identified sub-period.

2. The image-pickup apparatus according to claim 1, wherein the control means further comprises means for storing, by the storage-process means, the at least one image selected from the images temporarily retained in the retaining means based on a detected acceleration value showing stopping of a movement of the image-pickup apparatus.

3. The image-pickup apparatus according to claim 1, wherein the control means further comprises means for storing, by the storage process means, the at least one image selected from the images temporarily retained in the retaining means based on a detected acceleration value showing a value closest to stopping of a movement of the image-pickup apparatus.

4. The image-pickup apparatus according to claim 1, wherein the at least one sub-period is identified by evaluating whether a determined acceleration value is between a first acceleration threshold value and a second acceleration threshold value.

5. The image-pickup apparatus according to claim 1, further comprising warning means for outputting a warning, wherein, when the control means was not able to store the at least one image selected from the images temporarily retained in the retaining means, the control means causes the warning means to output the warning.

6. An image-pickup-control method for an image-pickup apparatus that picks up images of an object during a shutter operation period, the image-pickup-control method comprising:
    detecting acceleration of the image-pickup apparatus;
    identifying at least one sub-period within the shutter operation period during which the image pick-up apparatus experienced less than a threshold level of acceleration;
    temporarily retaining at least some of the images that were picked up during the at least one identified sub-period;

and issuing an instruction for a storage process of storing a selected picked-up image from among the temporarily retained picked up images based on an acceleration value that was detected for the selected picked-up image.

7. The method of claim 6, wherein the act of identifying the at least one sub-period comprises:

determining whether detected acceleration values are between a first acceleration threshold value and a second acceleration threshold value.

8. The method of claim 6, wherein the detected acceleration value for the selected picked-up image indicates a stopping of motion of the image-pickup apparatus.

9. The method of claim 6, wherein the detected acceleration value for the selected picked-up image indicates a motion closest to stopping of the image-pickup apparatus.

10. The method of claim 6, wherein the act of detecting acceleration of the image-pickup apparatus comprises detecting acceleration with an acceleration sensor.

11. The method of claim 6, further comprising providing a warning to a user of the image-pickup apparatus when the image pick-up apparatus did not experience less than the threshold level of acceleration during the shutter operation period.

12. An image-pickup apparatus comprising:

an image-pickup section configured to pick up images of an object to obtain picked-up-image-data items during a shutter operation period;

a temporarily retaining section configured to temporarily retain at least some of the picked-up-image-data items obtained by the image-pickup section;

a storage-process section configured to perform a storage process on the picked-up-image-data items temporarily retained in the temporarily retaining section;

a motion-detecting section configured to detect acceleration of the image-pickup apparatus;

an operation section configured to perform a shutter operation during the shutter operation period; and a control section configured to identify at least one sub-period within the shutter operation period during which the image-pickup apparatus experienced less than a threshold level of acceleration, and further configured to cause the temporarily retaining section to retain at least some of the picked-up-image-data items that were picked up during the at least one identified sub-period, wherein the control section is further configured to select, on the basis of acceleration values detected for respective ones of the temporarily retained picked-up-image-data items, a selected picked-up-image-data item to be subjected to the storage process from among the picked-up-image-data items retained by the temporarily retaining section.

13. The apparatus of claim 12, wherein the motion-detecting section comprises an acceleration sensor.

14. The apparatus of claim 12, wherein the at least one sub-period is identified by evaluating whether an acceleration value detected by the motion-detection section is between a first acceleration threshold value and a second acceleration threshold value.

15. The apparatus of claim 12, wherein the control section is further configured to identify the selected picked-up-image-data item based on a detected acceleration value indicating a stopping of motion of the image-pickup apparatus.

16. The apparatus of claim 12, wherein the control section is further configured to identify the selected picked-up-image-data item based on a detected acceleration value indicating a motion closest to stopping of the image-pickup apparatus.

* * * * *